United States Patent [19]  
do Espirito Santo

[11] Patent Number: 5,044,739  
[45] Date of Patent: Sep. 3, 1991

[54] AUXILIARY EXTERNAL REAR VIEW MIRROR SET FOR A MOTOR VEHICLE

[75] Inventor: Antonio F. do Espirito Santo, Sao Paulo, Brazil

[73] Assignee: Metagal Industria E Comercio Ltda., Sao Paulo, Brazil

[21] Appl. No.: 647,451

[22] Filed: Jan. 29, 1991

[30] Foreign Application Priority Data

May 30, 1990 [BR] Brazil ................................ 9002624

[51] Int. Cl.$^5$ ........................... G02B 5/10; B60R 1/08
[52] U.S. Cl. .................................... 359/864; 248/467; 248/479; 248/481; 359/865; 359/872; 359/866
[58] Field of Search ............... 350/624, 625, 626, 627, 350/632, 612; 248/467, 479, 481

[56] References Cited

U.S. PATENT DOCUMENTS

| | | | |
|---|---|---|---|
| 524,419 | 8/1894 | Gray | 350/626 |
| 1,114,559 | 10/1914 | Weed | 350/625 |
| 3,146,296 | 8/1964 | Fischer | 350/625 |
| 4,293,191 | 10/1981 | Kim | 350/625 |
| 4,311,363 | 1/1982 | Marsalka et al. | 350/625 |
| 4,526,446 | 7/1985 | Adams | 350/626 |
| 4,629,296 | 12/1986 | White | 350/625 |

Primary Examiner—Bruce Y. Arnold  
Assistant Examiner—R. D. Shafer  
Attorney, Agent, or Firm—Michael J. Striker

[57] ABSTRACT

The auxiliary external rear view mirror set has a smaller auxiliary convex mirror mounted on a smooth comparatively larger base mirror so that the smaller auxiliary convex mirror may be tilted to a limited extent to more precisely position the wide angle field of view it provides. The convex mirror is attached to a tilting plate by an adhesive means. The tilting plate has a central projecting member with a cavity. A support plate attached to the smooth base mirror by another adhesive means has a corresponding central bar with a spherical head which engages in the cavity of the tilting plate so that the convex mirror and tilting plate are pivotable. Stop pieces mounted on the support plate spaced from the central bar are positioned to be engagable with offset members attached to the rear side of the tilting plate so that the tilting of the convex mirror is limited to some extent.

6 Claims, 3 Drawing Sheets

AUXILIARY EXTERNAL REAR VIEW MIRROR SET FOR A MOTOR VEHICLE

BACKGROUND OF THE INVENTION

The present invention is related to an improved auxiliary external rear view mirror and sets of such mirrors for a motor vehicle, especially for a truck, bus and other heavy motor vehicle.

It is commonly known to provide a rear view mirror with an enlarged rear viewing field for the driver by mounting a smaller convex auxiliary mirror with a convex surface on a flat larger base mirror with a smooth surface located on a side of the motor vehicle within view of the driver. The smaller convex auxiliary mirror provides the driver with a wider field of vision to the side and rear of the vehicle than the larger flat surfaced base mirror on which it is mounted.

It is also already known to make the smaller convex auxiliary mirror separately from the larger base mirror. This smaller convex auxiliary mirror is made of a convex mirror glass plate directly mounted by adequate attachment means on the base mirror flat surface. This type of auxiliary external rear view mirror is simple to construct and easy to assemble, but there is no way to regulate the alignment of or position the smaller convex auxiliary mirror separately from the smooth flat base mirror, which makes it difficult for the driver to have a more clear rear view, particular for certain driving maneuvers.

SUMMARY OF THE INVENTION

Therefore, it is an object of the present invention to provide an auxiliary external rear view mirror set of the above-described type having a smaller convex auxiliary mirror mounted thereon, which is adjustable separately relative to the larger smooth base mirror on which it is mounted, while also providing an auxiliary external rear view mirror set of a simple structure which is easy to assemble.

According to the present invention, at least one adhesive means, advantageously an adhesive ribbon, is attached to a back side of the smaller convex auxiliary mirror, the smaller convex auxiliary mirror being attached to a tilting plate by this adhesive means. The tilting plate is, in turn, provided with a central cylindrical projecting member on its rear side which has a cavity therein. A support plate having a centrally front projecting bar with a spherical head is mounted directly on the smooth surface of the larger base mirror by another adhesive means, which may also be an adhesive ribbon. The spherical head of the projecting bar is dimensioned so that it fits in the cavity of the tilting plate, so that, when the tilting plate is engaged on the spherical head, the smaller convex mirror may be tilted. The support plate is also provided with at least one lateral stop piece spaced from the central bar and projecting from the support plate and the tilting plate is provided one its rear side with at least one corresponding offset member which is engagable on the stop piece. Thus, the tilting plate and the small convex mirror are pivotable to some extent being limited by the engagement of the stop piece on the offset member.

Advantageously two stop pieces and two offset members are provided. Furthermore the end of the stop piece may be provided with a V-shaped groove for easy engagement on an edge of the offset member.

A Scotch disk may be provided in the cavity of the central projecting member of the tilting plate to hold the spherical head of the central bar of the support plate. Reinforcing members may also be provided on the tilting plate.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE INVENTION

Figure 1:
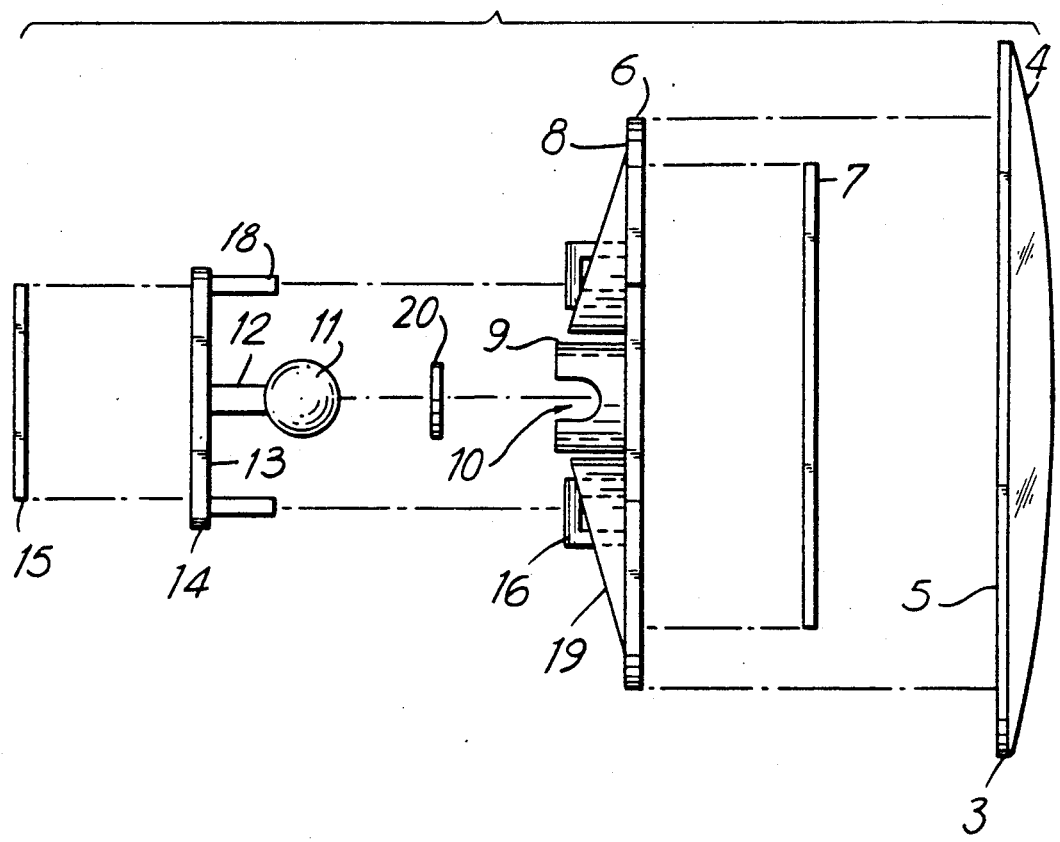
FIG. 1 is an exploded lateral plan view of a smaller convex auxiliary mirror of an auxiliary external rear view mirror set according to the present invention.
Figure 2:
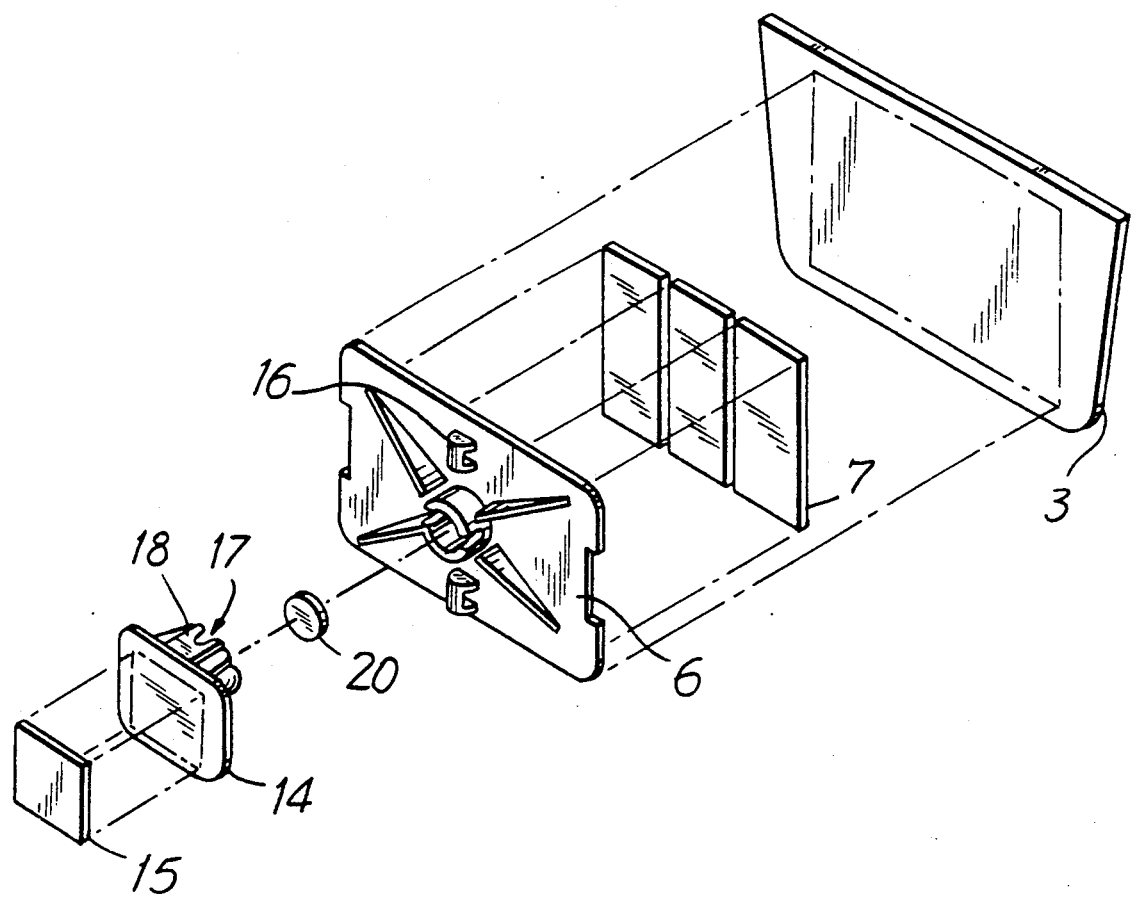
FIG. 2 is an exploded perspective view of the smaller convex auxiliary mirror shown in FIG. 1.
Figure 3:
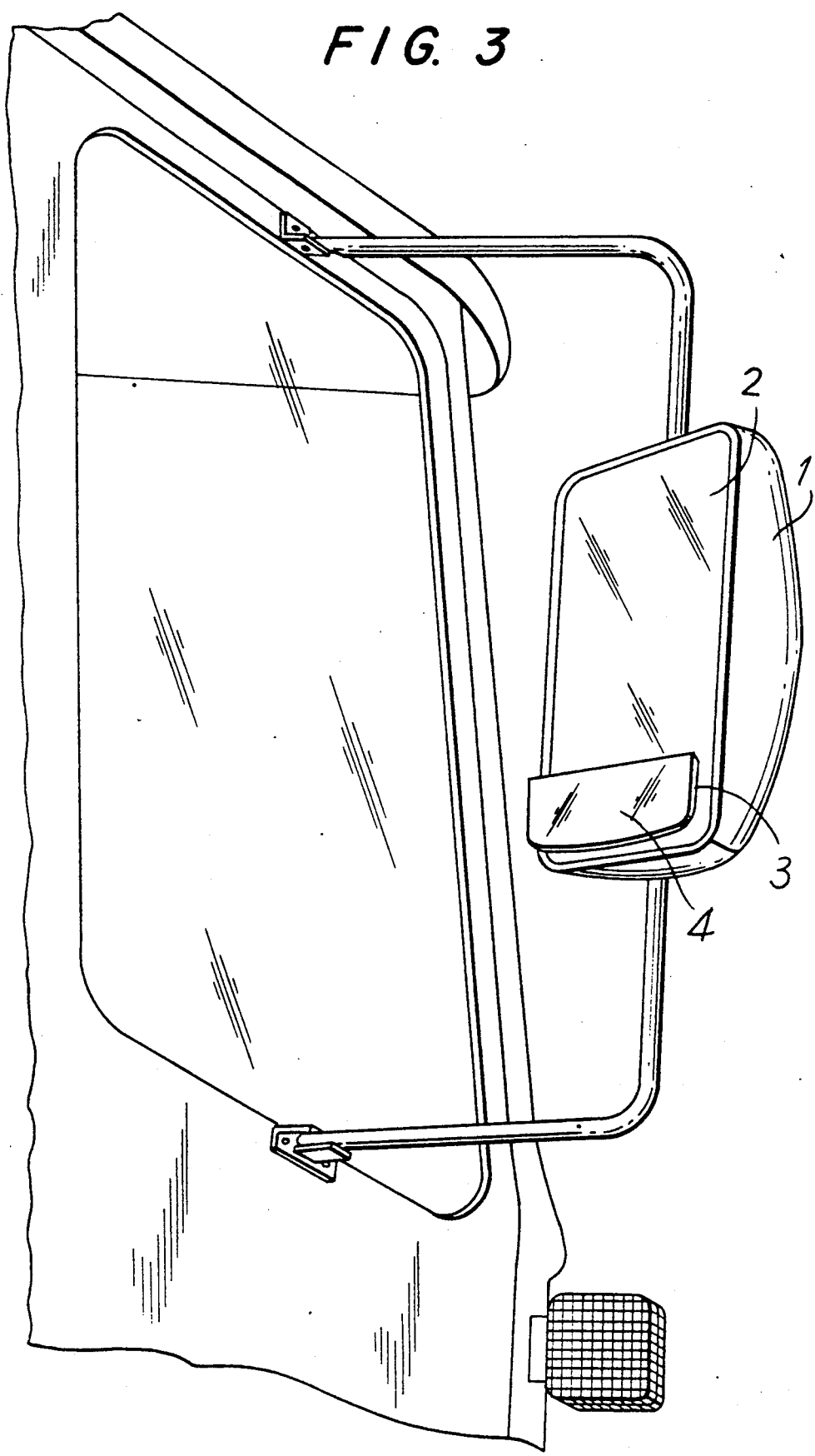
FIG. 3 is a perspective view of an auxiliary external rear view mirror set according to the present invention mounted on a side door of a motor vehicle, the smaller convex auxiliary mirror of FIG. 1 being mounted on a substantially flat larger base mirror.

The drawing in FIG. 3 shows an auxiliary external rear view mirror set improved beyond the state of the art which comprises a substantially flat, smooth larger base mirror 2 mounted in a mirror housing 1 attached to the side door of a motor vehicle. A smaller convex auxiliary mirror 3 with a convex front face 4 is mounted on a portion of the larger base mirror 2, this portion being preferably smaller than the remainder of the base mirror 2.

The smaller convex auxiliary mirror 3 is fixed to a tilting plate 6 by an adhesive means 7, e.g. an adhesive ribbon, which is applied to the side of the convex auxiliary mirror 3 opposite to the convex front face 4. The tilting plate 6 has a central cylindrical projecting member 9 on its rear side 8. This cylindrical projecting member 9 has a cavity 10, in which a spherical head 11 of a central bar 12 projecting from the front face 13 of support plate 14 fits. The support plate 14 may be attached to the smooth flat base mirror by another adhesive means 15, preferably an adhesive ribbon which has an adhesive substance on both of its sides.

On either side of the central cylindrical projecting member 9 two offset members 16 are attached to its rear side. Lateral stop pieces 18 are provided projecting from the support plate 14 on either side of the central bar 12. The ends of the stop pieces 18 each have V-shaped grooves 17 which are shaped to engage an edge of the offset members 16.

Reinforcing pieces 19 are provided in the embodiment shown in the drawing on the rear side 8 of the tilting plate 6. A Scotch 20 in the form of a disk is located in the bottom of the cavity 10 of the central projection 9. The spherical head 11 presses on this Scotch 20, which serves to regulate the spherical linkage.

In operation, the smaller convex auxiliary mirror 3 has the advantage of being positionable and/or adjustable independently from the larger base mirror 2. The length of the stop pieces 18 with the V-shaped grooves 17 on their top portions is such that the tilting plate 6 with the smaller convex auxiliary mirror 3 may be pivoted or tilted to a limited extent by means of the spherical linkage made up of the cylindrical central projecting member 9 with its cavity 10 and the spherical head 11 of the support plate 14. The movement of the tilting plate 6 and convex mirror is limited by the engagement of the offset members 16 with the stop pieces 18. Thus, because of the ability to tilt the smaller auxiliary convex mirror, the desired movability can be obtained and the wide field rear view provided by the convex mirror may be positioned for a more precise definition.

It will be understood that each of the elements described above, or two or more together, may also find a useful application in other types of structures differing from the types described above.

While the invention has been illustrated and described as embodied in an auxiliary external rear view mirror set for a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

I claim:

1. In an auxiliary external rear view mirror set of a motor vehicle, comprising a substantially smooth base mirror, a comparatively smaller auxiliary convex mirror having a convex front face and mounted on a reflective portion of said base mirror which is comparatively smaller than the remaining reflective portion of said base mirror, and means for mounting said auxiliary convex mirror on said base mirror, the improvement wherein said means for mounting said auxiliary convex mirror on said base mirror comprises a support plate fixedly mounted on said base mirror, said support plate having a front face and a central bar projecting from said front face, said central bar having a spherical head, said support plate also having at least one stop piece attached to said front face spaced from said central bar; an adhesive means for mounting said support plate on said base mirror; and a tilting plate having a front side and a rear side, said smaller auxiliary convex mirror being attached to said front side of said tilting plate by another adhesive means and said tilting plate having a central cylindrical projecting member with a cavity on a rear side thereof, said cavity being dimensioned so that said spherical head fits in said cavity, and said tilting plate also having at least one offset member spaced from said central cylindrical projecting member and positioned to be engagable by said stop piece of said support plate; said stop piece, said spherical head and said projecting member being structured so that said smaller convex auxiliary mirror and said tilting plate is tiltable to an extend limited by engagement of said stop piece on said offset member.

2. The improvement as defined in claim 1, further comprising a Scotch in the form of a disk positioned at the bottom of said cavity of said central projection on which said spherical head is placed.

3. The improvement as defined in claim 1, wherein said tilting plate is provided with reinforcing members on said rear side thereof.

4. The improvement as defined in claim 1, wherein said adhesive means is an adhesive ribbon having adhesive on both sides thereof.

5. The improvement as defined in claim 1, wherein said support plate has two of said stop pieces spaced from said central bar and said tilting plate has two of said offset members spaced from said projecting member positioned to engage said stop pieces, when said tilting plate is tilted.

6. The improvement as defined in claim 1, wherein said stop piece has a V-shaped groove structured to engage said offset member.

* * * * *